Figure 1:
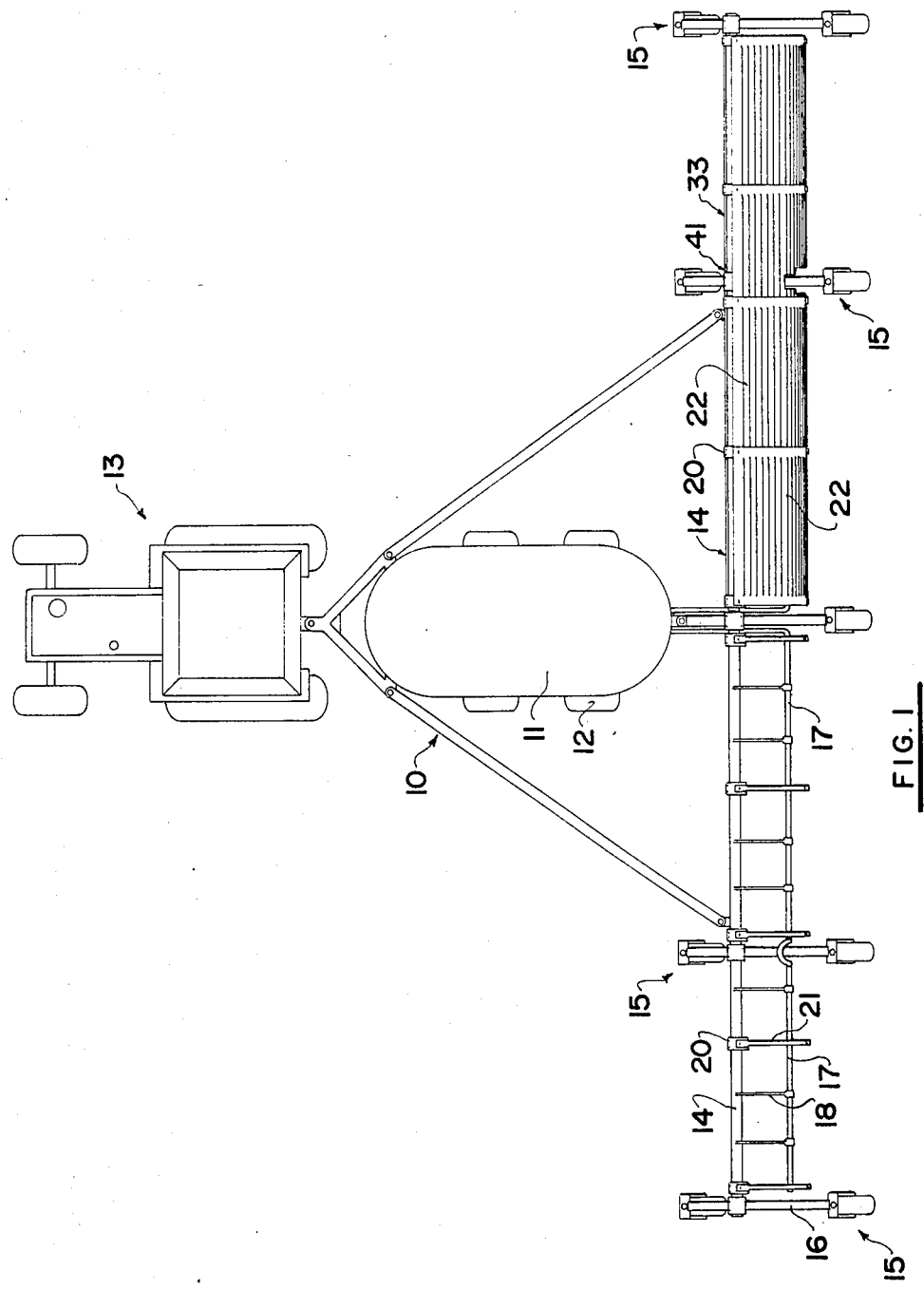

United States Patent [19]

McCrea et al.

[11] Patent Number: 4,641,781

[45] Date of Patent: Feb. 10, 1987

[54] COVERED FIELD SPRAYERS

[76] Inventors: David G. McCrea; Thomas E. McCrea, both of Box 993, Roblin, Manitoba, Canada, R0L 1P0

[21] Appl. No.: 692,228

[22] Filed: Jan. 17, 1985

[30] Foreign Application Priority Data

Aug. 24, 1984 [CA] Canada .................................. 461798

[51] Int. Cl.$^4$ .............................................. B05B 1/20
[52] U.S. Cl. .................................... 239/159; 239/172; 239/288.5; 47/1.7
[58] Field of Search ............... 239/150, 159, 161, 163, 239/164–169, 172, 288, 288.3, 288.5, 160, 176; 47/1.5, 1.7, 1.42, 1.44; 111/10, 11

[56] References Cited

U.S. PATENT DOCUMENTS

| 1,733,883 | 10/1929 | Jaecks | 47/1.7 |
| 2,029,166 | 1/1936 | Hales | 47/1.7 X |
| 4,274,589 | 6/1981 | Jones | 239/167 |

FOREIGN PATENT DOCUMENTS

| 242789 | 1/1963 | Austria | 47/1.7 |
| 622780 | 5/1949 | United Kingdom | 239/159 |

Primary Examiner—Joseph F. Peters, Jr.
Assistant Examiner—Mary Beth O. Jones
Attorney, Agent, or Firm—Stanley G. Ade

[57] ABSTRACT

A cover attachment which can be used on a conventional field sprayer or as original equipment includes the plurality of separate arch-shaped arms extending rearwardly from the elongate support frame. Over the arms and beyond the end of the arms is draped a cover in the form of a plurality of separate cover panels each of which has a central ribbed section and plain edges for overlapping at the arms. The arms are attached to the frame by collars surrounding the frame which collars also support a front sheet which extends downwardly from the frame to a position in contact with the crop. The front sheet is also of plastics material and includes a backing sheet to allow flexing while preventing splitting. The height of the front sheet is arranged so that it contacts the crop and bends it forwardly so the nozzle can spray directly onto the bent crop. The height of the arched cover sheet at the rear edge is arranged to be above the top of the crop to avoid wiping the liquid from the crop.

16 Claims, 6 Drawing Figures

COVERED FIELD SPRAYERS

This invention relates to a covered field sprayer particularly of the type which includes an elongate support frame, means supporting the support frame for transport across the field transverse to the length of the frame, a liquid supply boom extending longitudinally of the frame and a plurality of nozzles along the length of the boom for spraying the field.

Generally sprayers of this type have included a pair of such booms extending outwardly from central wheeled truck section supporting the liquid supply tank. Such sprayers can come in various lengths and with various wheel supporting arrangements depending upon the required use but generally in relation to field sprayers an overall length of 60 to 100 feet is common.

All such sprayers in recent common use have been opened to the elements that is the frame work of supporting the boom and nozzle have been merely sufficient to provide structural support and therefore the nozzles and more particularly the liquid as it exits from the nozzles and travels to the ground has been exposed to air movements caused by both the wind and also the movement of the sprayer across the field.

While the movement across the field is relatively constant and can therefore be accommodated by suitable adjustment of the nozzles, the wind of course varies in force and also in direction bearing in mind of course that the direction of the field sprayer also varies relative to the wind.

The velocity of the wind has therefore been a very important controlling factor in the time that spraying can take place. To accommodate this many farmers spray in the few hours in the very early morning when the wind velocity is at its lowest.

However, there remains a desire to be able to spray regardless of wind velocity at the most efficacious time with regard to the plant growth regardless of wind velocity during that time.

Arrangements for covering sprayers of this type have been developed and used on a very limited scale during previous years. However, these have been used only on an experimental basis while various machines have not reached commercial production.

It is one object of the present invention therefore to provide an improved cover arrangement which can be manufactured and used commercially either in relation to original equipment manufacture or as a retrofit kit for existing sprayers.

According to one aspect of the invention, the frame for attachment to the sprayer support frame provides a plurality of collars which can be clamped around the support frame in spaced relation along the support frame with each including a rearwardly extending arch shaped arm for supporting a flexible sheet cover extending over the frame.

Particularly advantageously, the cover also includes a front sheet which is attached by an attachment member bolted to the collars along the front of the support frame.

According to the second aspect of the invention the flexible sheet cover is formed in a plurality of separate pieces each formed from plastic material with the pieces arranged overlapping and longitudinally of the support frame. The sheets can include longitudinal ribs to increase strength and to provide improved control over air movement. Thus the sheets can be effectively self supporting extending from one arm to the next with the overlapping being provided at the arms and attachment to the arms by pins passing through reinforced holes in the edges of the sheets.

According to a further aspect of the invention the front sheet which extends downways toward the ground is arranged to terminate at a level just above the ground so that it wipes the crop as it moves forwardly over the ground and the nozzles are arranged to spray onto the crop just behind the front sheet at a position where the crop is bent forwardly.

Furthermore the cover sheet can include a downwardly extending rear sheet which terminates at a position above the bottom of the front sheet so as to just clear the crop to avoid wiping the sprayed liquid from the crop or wiping dust onto the crop.

With the foregoing in view, and other advantages as will become apparent to those skilled in the art to which this specification proceeds, the invention is herein described by reference to the accompanying drawings forming a part hereof, which includes a description of the preferred typical embodiment of the principles of the present invention, in which:

DESCRIPTION OF THE DRAWING

FIG. 1 is a plan view of a field sprayer incorporating a cover arrangement according to the invention with one-half of the sprayer having the cover sheets removed to show the frame structure.

FIG. 2 is a cross-sectional view on a large scale along the lines 2—2 of FIG. 3.

FIG. 3 is a plan view of the structure of FIG. 2 on the same scale as FIG. 2.

FIG. 4 is a side elevational view similar to FIG. 2 of a modified frame arm.

FIG. 5 is a plan view similar to FIG. 3 of a modified frame structure.

FIG. 6 is a cross-sectional view along the lines of 6—6 of FIG. 5.

In the drawings like characters of reference indicate corresponding parts in the different figures.

DETAILED DESCRIPTION

Turning firstly to FIG. 1 there is shown basically a conventional field sprayer comprising a central support truck generally indicated at 10, including a tank 11 and ground wheels 12 for towing by a tractor schematically indicated at 13. Other arrangements for providing the central support are of course well known including a spray tube or a truck mount and it will be appreciated that the invention can be used with any of these arrangements.

The conventional spray boom which extends outwardly from the central truck 10 comprises elongate support frame 14, mounted on ground wheels. The ground wheels, in many cases, include a walking beam 16, with a caster wheel at the front and rear of the walking beam. In other cases a simple caster wheel can be supported or attached to the support frame 14.

A liquid supply tube 17, or boom, extends from the tank 11 outwardly along the frame 14 and supported on a number of brackets 18 which are welded to the frame 14. Not visible in FIG. 1 is a plurality of nozzles which are positioned along the tube 17 at suitable locations to provide a fan pattern of spray which is adjusted to provide complete coverage of the ground.

A cover attachment for conventional sprayer of this type comprises a plurality of collars 20 each of which supports a respective frame arm member 21 for supporting a number of cover panels 22. Thus from FIG. 1 it will be seen that five such collars and respective arms are mounted on each boom one at each end and three central ones substantially equally spaced with four corresponding cover panels overlaying the arms and abutting with a slight overlap at the arms. In the example shown which can be, for example, 30 foot booms, the panels are basically 8 feet in length so that a shorter panel of 6 feet length is required and is positioned at one intermediate position. This can be obtained simply by cutting the requisite length from one of the basic panels.

Figure 2:
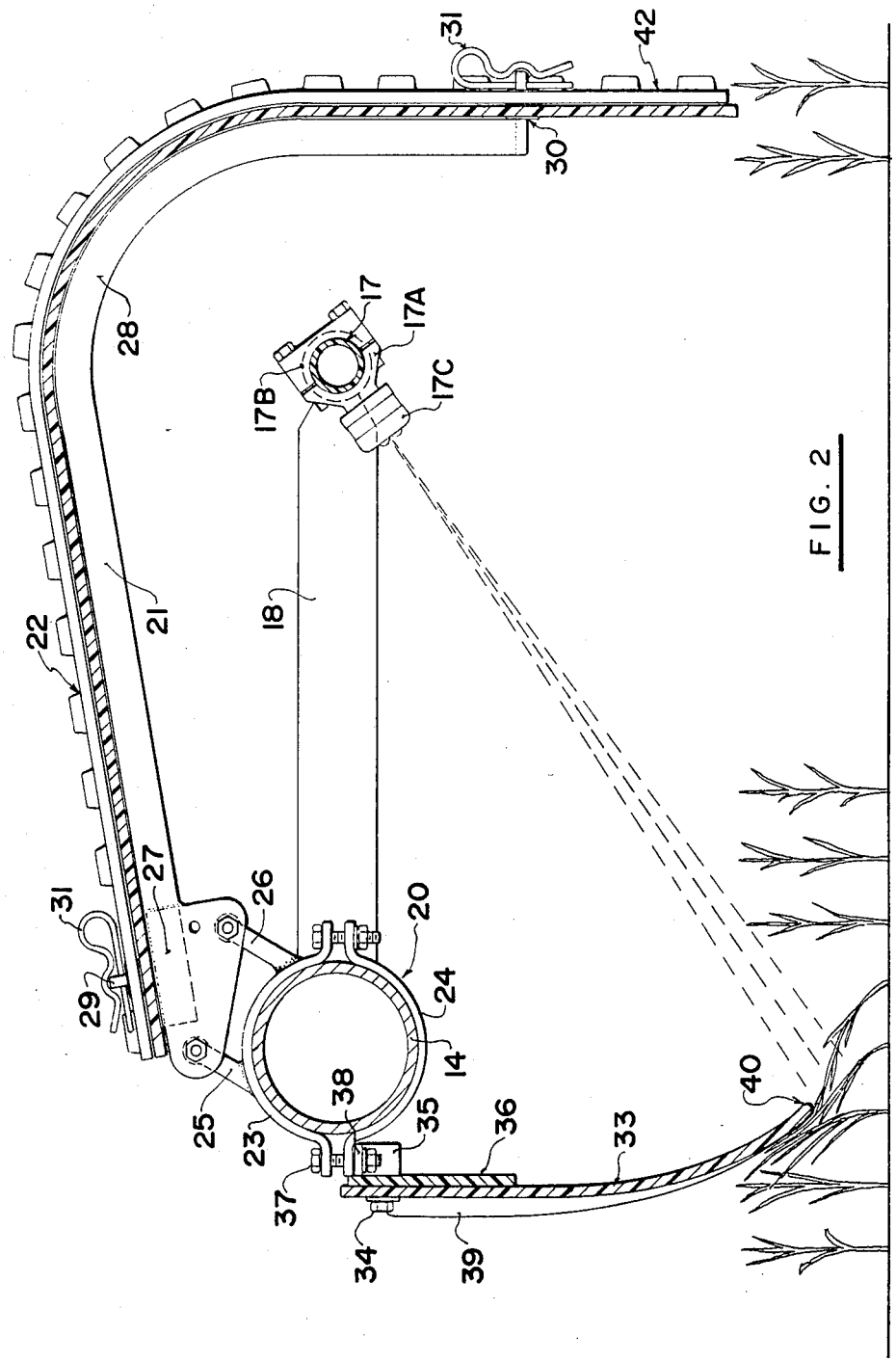
Figure 3:
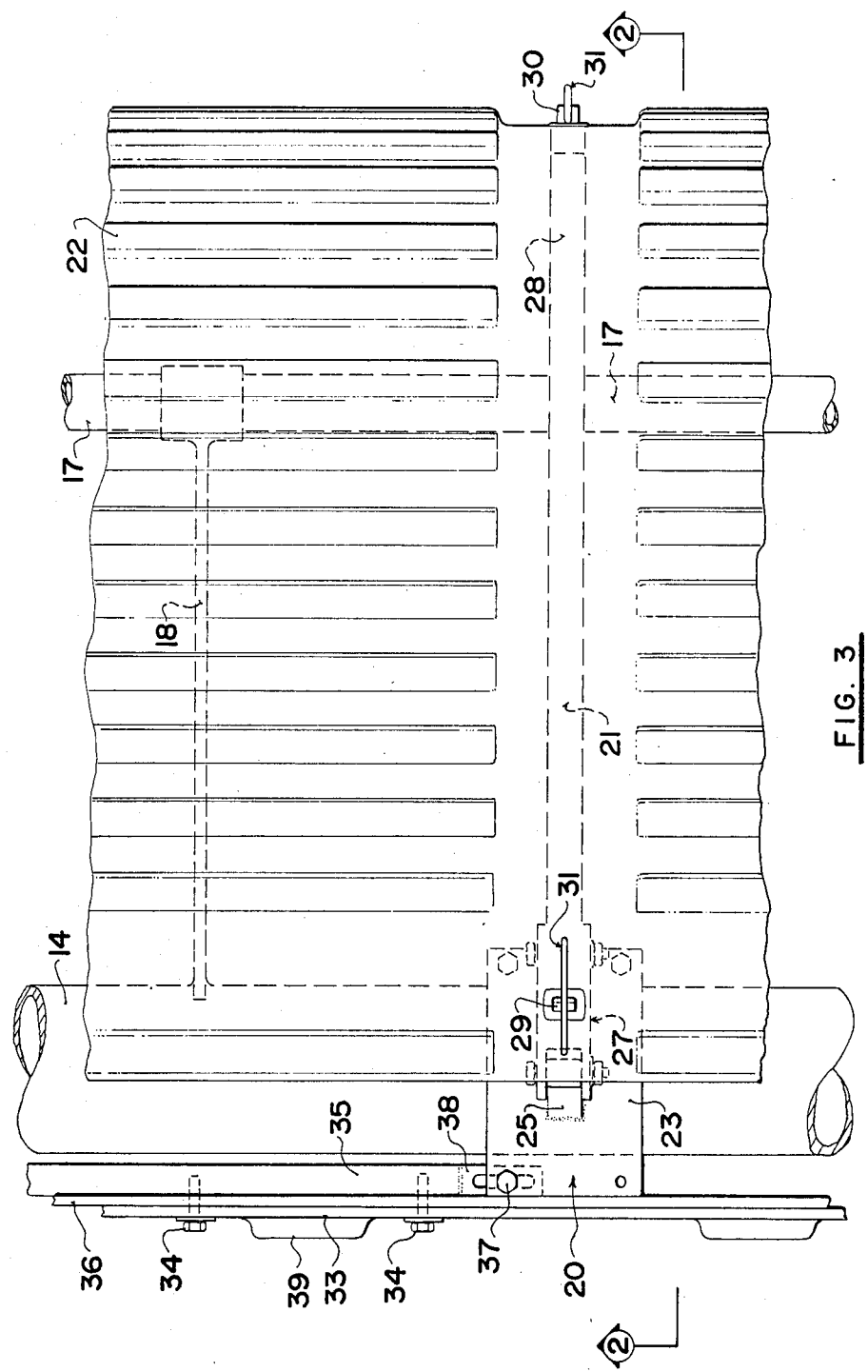
Figure 4:
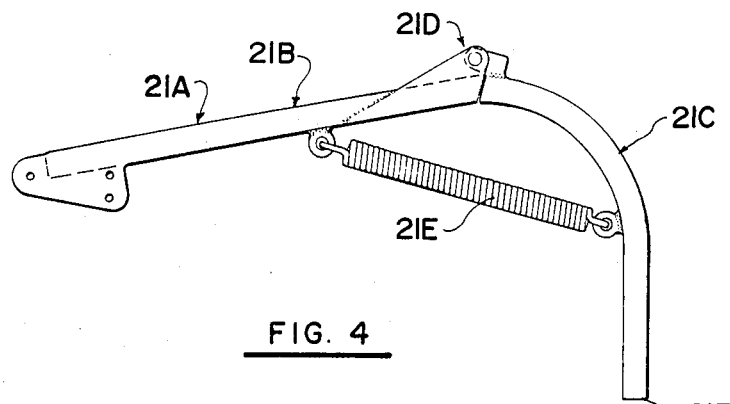

Turning now to FIGS. 2 and 3 which show the cover attachment in more detail, it will be noted firstly that the elongate support frame 14 is in the form of a tube of circular cross section as is conventional. The brackets 18 are welded to this tube so as to extend rearwardly and upwardly to support the liquid supply tube 17. As is well known adjustment of the height of the tube 17 from the ground is obtained by rotating the tube frame 14 by a central mechanism (not shown).

One of the collars 20 is shown in FIGS. 2 and 3 and comprises a pair of semicircular collar portions 23 and 24 which are clamped together by outwardly extending flanges using bolts passing through both the flanges. The upper collar portion 23 includes a pair of upstanding support flanges 25 and 26 each of which provides at its top a longitudinally extending bore for receiving a bolt whereby the arm 21 can be bolted to the flanges 25 and 26 by a pair of parallel brackets 27. Each of the brackets 27 includes a pair of holes for cooperating with the flange 26 whereby the angle of the bracket 27 and therefore the arm 21 relative to the tube 14 can be adjusted.

The arm 21 therefore extends in a first straight portion upwardly and rearwardly of the tube frame 14 to an apex 28 above and slightly rearwardly of the liquid tube 17, from which apex the arm 21 curves downwardly through a smooth curve terminating in a lower portion which curves slightly inwardly or forwardly. The arm 21 can be manufactured from square tubing of suitable dimensions. The outer surface of the arm 21 carries a pair of pins 29 and 30 which extend outwardly therefrom at right angles and are apertured to receive split pins 31.

The cover sheet portion 22 is formed of a vacuum moulded plastics material preferably polyethylene which provides a series of longitudinal ribs, the ribs being arranged side by side so as to completely fill the panel or portion from one longitudinal edge to the other longitudinal edge.

At each transverse edge there is a strip of the order of 4 inches wide into which these ribs do not extend. The panel is formed for example from 16 material and this provides sufficient strength for it to lie from one arm to the next without the necessity for intermediate support.

As shown in FIGS. 2 and 3 the cover panel 22 is attached onto the arm 21 by passing the pins 29 and 30 through reinforced apertures in the edge of the panel. The apertures can be reinforced by suitable grommets so the split pins act against the grommets rather than the material itself and therefore avoid splitting of the material.

A front cover sheet 33 is arranged to hang downwardly from the front edge of the tube 14 so it can confine the front surface of the sprayer. The front sheet 33 is again formed in sections with each section bolted by bolts 34 onto a tubular strip 35. Between the sheet 33 and the tube 35 is a backing strip 36 which is slightly thicker and therefore more resistant than the sheet 33 and has a very much less height so it extends only over the upper proportion of the sheet 33 to resist bending and twisting movements of the sheet at the upper edge which could otherwise cause tearing from the bolt 34. The tube 35 is in turn bolted via the bolts indicated at 37 which clamp the collar halves 23 and 24. More specifically a flange 38 at one end of the tube 37 extends beyond the tube for attachment to the bolt 371. Thus the main cover panel 22 mounted on the arms 21 is attached to the collar 20 and at the same time the front sheet and supporting tube 35 are also attached to the collar 20 thus providing a simple single attachment by a number of readily attached and removed collars 20.

The front sheet 33 includes a number of vertical ribs 39 which taper from the upper edge of the sheet toward the lower edge. The bottom edge 40 of the sheet is curved rearwardly so as to avoid presenting sharp edges to the crop.

The front sheet 33 is arranged to terminate at a walking beam 16 as shown in FIG. 3 and a small piece 41 of the front sheet is attached suitably to the walking beam so as to pivot with the walking beam and to avoid flexing of the front sheet as the walking beam pivots. The upper panel 22 can in fact extend beyond the walking beam but suitable cut outs at the rear surface can be provided to avoid again movement of the walking beam continually flexing the cover 22.

Figure 5:
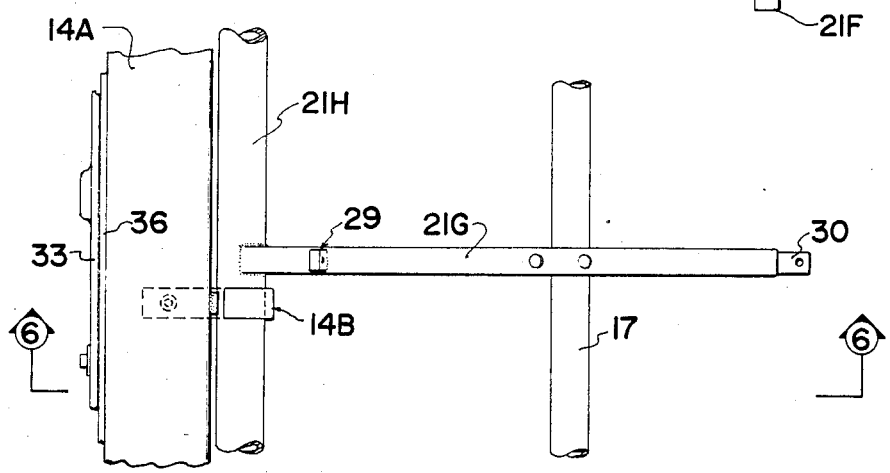
Figure 6:
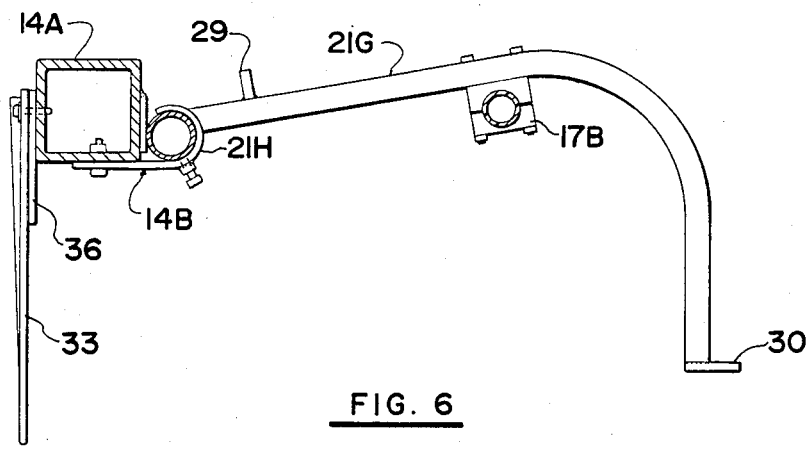

In operation as shown particularly in FIG. 2, the height of the tube 14 is set in conventional manner so the tube is of sufficient height to pass over obstructions and to provide the desired spraying effect. The angle of the bracket 18 is then adjusted to adjust the height of the nozzle 17. The height of the tube 14 is also chosen in order to control the position of the bottom end of the front sheet 33 so that it passes at a desired height relative to the crop. This desired height is chosen so the crop is bent over by contact with the front sheet as shown in FIG. 2. The nozzle 17 is adjusted so that it sprays onto the crop just behind the front sheet so that the spray contracts the crop or weeds while they are bent over which has been suggested to be the most efficacious way of applying the liquid. The position of the arm 21 can also be adjusted as previously explained to control the height of the cover 22 relative to the nozzle 17 and relative to the ground. This will be noted that the rear end of the cover 22 includes the portion 42 which extends downwardly from the bottom edge of the arm 21 in unsupported manner to a position which is chosen to be just above the height of the crop to avoid contracting the crop and wiping the fluid from the crop or otherwise interfering with the proper application of the fluid.

Turning now to FIG. 4 there is shown a single arm 21A which is a modification of the arm 21 of FIG. 2. In this modification the arm 21A is split into two portions 21B and 21C which are connected by a hinge 21D. A spring 21E interconnects the two portions so that if the bottom edge 21F of the arm engages the ground it can move away against the bias the spring to avoid damage to the arm or to the cover. Arms of this type can be positioned at the ends of the boom where the changes in height of the ground are more susceptible to cause damage.

Turning now to FIGS. 5 and 6 there is shown a modified arrangement which is particularly suitable for original equipment. In this case the elongate frame tube 14A is of square cross section. In this case the front sheet 33 and the backing sheet 36 are directly bolted to the front surface of the tube 14A. Also the arrangement is modified in that the arms 21G are welded to a tube 21H which is supported on brackets 14B bolted to the tube 14A. The liquid supply tube 17A is in this embodiment directly attached to the arm 21G by a suitable clamp 17B. Thus the frame provided by the arms 21G acts to support not only the upper cover 22 but also the supply tube or boom 17A and the nozzles 17C. The height of the nozzles can be adjusted by twisting the tube 21H in the brackets 14B by a central arrangement (not shown) similar to the device for twisting the tube 14 of the conventional spray boom arrangement. For convenience of illustration the cover 22 is omitted from FIGS. 5 and 6.

It will be noted from FIG. 2 that there is an opening between the frame 14 and the front edge of the upper cover which allows the ingress of air. This air can equalize air pressure inside and outside the cover thus avoiding an adverse effect on the spray pattern which can otherwise be caused. Alternatively holes or openings can be cut in the upper surface of the upper sheet to provide the same effect.

End covers can generally be provided but are omitted from the drawings and above description for convenience.

As an alternative to the two pieces providing the front sheet and the top cover sheet, an arrangement (not shown) can be provided with a single cover extending over from the front lower edge to the rear edge. The frame 21 can thus include a forwardly depending leg to support the front cover portion.

Since various modifications can be made in my invention as hereinabove described, and many apparently widely differed embodiments of same made within the spirit and scope of the claims without departing from such spirit and scope, it is intended that all matter contained in the accompanying specification shall be interpreted as illustrative only and not in a limiting sense.

We claim:

1. A field sprayer of the type having a frame in the form of an elongated tubular support bar, means supporting the support bar for transport in a forward direction transversely to its length over the ground, a liquid supply boom supported longitudinally of the support bar, a plurality of nozzles along the length of the boom for spraying a field with the liquid, and a cover attachement comprising a plurality of collars each adapted to be clamped around the elongated support bar by bolt means in spaced relation along the length of the support bar, a plurality of frame means for attachment to and support by said collars, each of said frame means comprising a single strut having one end thereof attached to and supported solely by a respective one of the collars and free from interconnections with adjacent struts and arranged to extend from said one end at said collar in a rearward direction therefrom over and beyond said nozzles to a remote end cantilevered from said collar and flexible sheet means extending over and supported by said frame means to cover said nozzles, said flexible sheet means being formed from plastics material in sheet portions separated longitudinally of the elongate support bar and the sheet portions being overlapped at and attached to the struts and being substantially self-supporting between the struts.

2. The attachment according to claim 1 wherein each strut is generally of arch shape.

3. The attachment according to claim 2 wherein the end of each said arched strut remote from the respective collar includes a spring trip mechanism to allow bending movement of the end away from the respective collar.

4. The attachment according to claim 1 wherein the sheet means hangs downwardly over an unsupported length from an edge of the frame means remote from the collar.

5. An attachment according to claim 1 including a substantially vertical front sheet forward of said collars separate from said sheet means and a front sheet support member arranged for attachment to said collars so as to extend longitudinally of said elongated support frame.

6. An attachment according to claim 1 including a substantially vertical front sheet forward of said collar separate from said sheet means and formed of a flexible plastics material, the front sheet being arranged so as to be attached at spaced positions along the length of the elongate support frame by members passing through said sheet material and wherein there is provided a backing sheet of less height than said front sheet and attached by said members so as to extend downwardly therefrom immediately adjacent to and rearward of the front sheet.

7. An attachment according to claim 6 wherein the front sheet includes a plurality of vertical stiffening ribs.

8. An attachment according to claim 7 wherein the vertical stiffening ribs taper in depth toward a bottom edge of the front sheet.

9. An attachment according to claim 1 wherein each sheet portion includes a plurality of ribs longitudinally thereof leaving at least one plain edge for overlapping with the next adjacent sheet portion.

10. Attachment according to claim 1, including a pair of spaced reinforced holes at each transverse edge of said sheet portions whereby the sheet portion can be attached by a pin passed through the holes from the strut.

11. An attachment according to claim 1 including a front sheet for positioning forwardly of the nozzles, said sheet means including a rear edge rearwardly of the nozzles so that the front sheet has a lower edge which depends downwardly toward the ground, the rear edge being arranged at a position spaced from the ground by distance greater than the spacing of the lower edge of the front sheet from the ground.

12. An attachment according to claim 11 wherein the front sheet is arranged to engage the crop and wherein the rear sheet is arranged so as to just clear the crop.

13. An attachment according to claim 12 wherein the nozzles are arranged to spray onto the crop as it is bent forwardly by the front sheet.

14. A cover attachment for a field sprayer of the type having elongate support frame means supporting the support frame for transport in a forward direction transversely to its length, a liquid supply boom supported longitudinally of the support frame and a plurality of nozzles along the length of the boom for spraying the field, the cover attachment comprising frame means and cover means extending over said frame means for covering said nozzles, said cover means including a flexible front sheet depending downwardly toward the ground at a position forwardly of said nozzles, the front sheet being arranged such that in use it engages the crop and bends it forwardly as the sprayer is moved forwardly across the field, said front sheet being separate from sheet means extending over said frame means for covering said nozzles, said front sheet being formed from flexible plastics material and arranged so as to be attached at spaced positions along the length of the elongate support frame by members passing through said sheet material, and wherein there is provided a backing sheet of less height than said front sheet and attached by said members so as to extend downwardly therefrom immediately adjacent to and rearward of the front sheet.

15. A cover attachment for a field sprayer of the type having an elongate support frame, means supporting the support frame for transport in a forward direction transversely to its length, a liquid supply boom supported longitudinally of the support frame and a plurality of nozzles along the length of the boom for spraying the field, the cover attachment comprising frame means providing a plurality of arm members extending transversely to the length of the support frame and flexible sheet means for extending over said frame means to cover said nozzles, said flexible sheet means being formed from plastics material in sheet portions separated longitudinally of the support frame, the portions being arranged to overlap at and being connected to the arm members, and being supported solely at said arm members so as to be effectively self-supporting therebetween, wherein each sheet portion includes a plurality of ribs longitudinally thereof leaving at least one plane edge for overlapping the next adjacent sheet portion.

16. An attachment according to claim 15 including a pair of spaced reinforced holes at each transverse edge of a sheet portion whereby the sheet portions can be attached by a pin passed through the holes from the frame means.

* * * * *